(12) United States Patent
Ilenda et al.

(10) Patent No.: US 6,207,747 B1
(45) Date of Patent: *Mar. 27, 2001

US006207747B1

(54) ACRYLIC FLEXIBLE LIGHT PIPE OF IMPROVED PHOTO-THERMAL STABILITY

(75) Inventors: Casmir Stanislaus Ilenda, Holland, PA (US); Phelps Brian Johnson, Wauwatosa, WI (US); Michael Paul Hallden-Abberton, Maple Glen, PA (US)

(73) Assignee: Fiberstors Incorporated, Solon, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,875

(22) Filed: Dec. 11, 1997

Related U.S. Application Data

(60) Provisional application No. 60/033,024, filed on Dec. 17, 1996.

(51) Int. Cl.[7] .............................. C08L 33/06; C08K 5/13; C08K 5/49; B29D 11/00
(52) U.S. Cl. .................... 524/560; 524/115; 524/323; 385/141; 428/375
(58) Field of Search ................... 523/201, 124; 385/141; 524/560, 115, 323; 428/375

(56) References Cited

U.S. PATENT DOCUMENTS

| 3,423,376 | | 1/1969 | Gobran et al. . | |
|---|---|---|---|---|
| 4,478,990 | | 10/1984 | Kohno et al. . | |
| 4,957,974 | * | 9/1990 | Ilendra et al. ................ | 525/301 |
| 5,258,422 | * | 11/1993 | Chang et al. ................. | 523/124 |
| 5,384,173 | * | 1/1995 | Akao et al. .................. | 428/35.7 |
| 5,406,641 | | 4/1995 | Bigley et al. . | |
| 5,485,541 | * | 1/1996 | Bigley, Jr. et al. ............. | 385/141 |

FOREIGN PATENT DOCUMENTS

| 0 108 946 | 5/1984 | (EP) . |
|---|---|---|
| 0 169 536 | 1/1986 | (EP) . |
| 0 629 493 | 12/1994 | (EP) . |
| 0 733 452 | 9/1996 | (EP) . |
| 246613 | 11/1998 | (EP) . |
| 2692683 | 6/1992 | (FR) . |
| 58-142931A | 8/1983 | (JP) . |
| 60-222803 | 11/1985 | (JP) . |
| 60-222804 | 11/1985 | (JP) . |
| 60-260005 | 12/1985 | (JP) . |
| 63-074008 | 4/1988 | (JP) . |
| 63-074009 | 4/1988 | (JP) . |
| 63-074012 | 4/1988 | (JP) . |
| 63-163306 | 7/1988 | (JP) . |
| 63-228104 | 9/1988 | (JP) . |
| 63-251408 | 10/1988 | (JP) . |
| 63-293508 | 11/1988 | (JP) . |
| 01014216 | 1/1989 | (JP) . |
| 01062315 | 3/1989 | (JP) . |
| 02113206 | 4/1990 | (JP) . |
| 02228610 | 9/1990 | (JP) . |
| 02289605 | 11/1990 | (JP) . |
| 03056906 | 3/1991 | (JP) . |
| 03238325 | 10/1991 | (JP) . |
| 05051506 | 3/1993 | (JP) . |
| 05224032A | 9/1993 | (JP) . |
| 60-21012 | 2/1998 | (JP) . |
| WO 97/15846 | 5/1997 | (WO) . |

OTHER PUBLICATIONS

Patent Abstracts of Japan, vol. 008, No. 184 (C–239), Aug. 23, 1984 & JP 59 078220 A (Sansutaa Giken KK), May 7, 1984.

Patent Abstracts of Japan, vol. 008, No. 184 (C–239), Aug. 23, 1984 & JP 59 078221 A (Sanbsutaa Giken KK), May 7, 1984.

Patent Abstracts of Japan, vol. 095, No. 004, May 31, 1995 & JP 07 025959 A (Toagosei Chem Ind Co Ltd.), Jan. 27, 1995.

* cited by examiner

*Primary Examiner*—David W. Wu
*Assistant Examiner*—Kelechi C. Egwim
(74) *Attorney, Agent, or Firm*—Charles E. Bruzga

(57) ABSTRACT

Acrylic light pipe has adequate thermal and photo-thermal stability for many purposes, but is deficient in maintaining clarity, color, and good optical properties under conditions of exposure to high temperatures, especially in combination with exposure for lengthy periods to passage of light. Improved thermal stability, as reflected in reduced color formation, can be imparted by adjusting the polymerization conditions to produce the uncured core polymer of the core/clad construction with a much reduced terminal vinyl content, preferably below 0.5 vinyl groups/1000 monomer units. This process improvement, in combination with selected addition of a combination of certain hindered phenols and hydrolytically stable organic phosphites, together produce a substantial improvement in the resistance to discoloration under photo-thermal conditions, while maintaining the resistance to discoloration under thermal conditions. The known process conditions which do not yield lower terminal vinyl content, in combination with the selected additives, also produce acrylic light pipe with greatly improved photo-thermal stability.

8 Claims, No Drawings

ACRYLIC FLEXIBLE LIGHT PIPE OF IMPROVED PHOTO-THERMAL STABILITY

This is a nonprovisional application of prior pending provisional application Ser. No. 60/033,024 filed Dec. 17, 1996.

This invention relates to processes, continuous processes and related compositions for producing a more photo-thermally stable flexible light pipe ("FLP") based on polymerized units of one or more acrylic esters, and the improved FLP product which the process produces.

An effective process for preparation of acrylic-based flexible light pipe is disclosed in two patents to Bigley et al., U.S. Pat. Nos. 5,406,641 and 5,485,541. In a preferred aspect of this process, a crosslinkable core mixture is present which comprises an uncrosslinked copolymer formed mainly from acrylic esters and monomers with functionally reactive alkoxysilane groups, along with a reactive additive to cure the uncrosslinked core polymer by crosslinking it, the reactive additive preferably being water and a silane condensation reaction catalyst, such as an organotin dicarboxylate. The core mixture is preferably polymerized by a bulk (non-solvent) process, more preferably by a continuous bulk process, the uncrosslinked copolymer preferably being devolatilized prior to co-extrusion with a cladding, preferably of a fluoropolymer, into a core/clad composite which is then separately cured to the final flexible light pipe.

The process based on a monomer such as ethyl acrylate taught by Bigley et al. yields a flexible light pipe or optical conduit which has high white light transmission, and acceptable flexibility and hardness for a variety of uses where light is to be conveyed from a remote source to a target and where the conduit needs to be flexible to follow a tortuous path, yet hard enough to retain its critical geometry.

The existing process further produces a FLP of adequate thermal (exposure to heat in the absence of visible light being conducted through the light pipe) and photo-thermal (Joint exposure to heat and to visible light conducted through the light pipe, which may contain light of wavelengths known as the "near ultraviolet") stability even after exposures to long hours of light and ambient heat. The prior art polymer has adequate stability for exposure to higher temperatures, including those up to about 90° C., for shorter use times.

However, there is a potential large market for light pipe which is thermally and photo-thermally stable at higher temperatures and longer exposure times, such as in automotive uses where the light is conducted near the engine compartment, and temperatures of 120° C. or higher may be reached. Other potential uses where high temperatures may be encountered may be when the light source is not adequately shielded from the connection with the FLP, or where the light source is of extremely high intensity. Photo-thermal stability becomes important when the light is conveyed through the FLP for long periods of time, accompanied by exposure to temperatures well above room temperature. Bigley et al. teach in general the use of stabilizers as part of the core component, but do not specifically teach or suggest an acceptable answer to this important stabilization problem.

We have discovered an improved process by which to prepare a crosslinkable acrylic core for a FLP which, after curing to crosslink, exhibits surprisingly improved stability to thermal and photo-thermal aging while detaining its other desirable properties of good initial clarity, absence of initial color, good flexibility, and adequate hardness to prevent physical distortion. An improved product, especially toward thermal aging in the absence of light being bassed through the core, can be prepared by carefully controlling the temperature of the process, preferably shortening somewhat the residence time in the reactor, and controlling the nature of the initiator, so as to decrease the number of terminal vinyl groups in the polymer. This invention is specifically addressed in a provisional United States application by several of the present inventors filed Oct. 8, 1996, as Ser. No. 60/27,942. However, the photo-thermal stability conferred by the process changes is not sufficient to enable the FLP to be used under certain demanding end-use conditions. By specific choice of a combination of antioxidants and thermal stabilizers, preferably in combination with the process improvements, the target of acceptable photo-thermal stabilization has been accomplished.

More specifically, we have discovered a crosslinkable core mixture for a subsequently-cure cured composite which mixture contains a thermoplastic core polymer, the thermoplastic core polymer having a weight average molecular weight from about 2,000 to about 250,000 daltons and preferably a vinyl end-group content of below 0.5 per 1000 monomer units, the core mixture comprising (a) a thermoplastic core polymer comprising
  i) from 80 to 99.9 weight percent of polymerized units of a $C_1$–$C_{18}$ alkyl acrylate or mixtures thereof with up to 50 weight percent of the components of (a)(i) of polymerized units of a $C_1$–$C_{18}$ alkyl methacrylate;
  ii) from 0.1 to 18.2 weight percent of polymerized units of a functionally reactive monomer, and
  iii) from 0 to about 10 weight percent of polymerized units of a refractive index increasing monomer selected from styrene, benzyl acrylate, benzyl methacrylate, phenylethyl acrylate or phenylethyl methacrylate;
  iv) 0.002 to 0.3, preferably 0.01 to 0.3, weight percent of residual molecules of or of decomposition products of an initiator of polymerization, including end groups on the thermoplastic core polymer, the initiator preferably having a half-life at 60° C. of 20 to 400 minutes, more preferably 100–250 minutes;
  v) 0.2 to 2.0, preferably 0.6 to 1.5, weight percent of residual molecules of or of decomposition products of a chain transfer agent, including end groups on the thermoplastic core polymer;
(b) from 0.1 to 10 weight percent, based on the crosslinkable core mixture weight, of a reactive additive; and
(c) from 0.01 to 1.0 weight percent, based on the crosslinkable core mixture weight, of a stabilizer/antioxidant combination comprising 20–80 weight percent, based on the combination, of an organic phosphite which is hydrolytically stable and 80–20 weight percent, based on the combination, of a hindered phenol, the phenol preferably separately exhibiting an absorbance of less than 1 in a 5% ethyl acetate solution in a 10 cm. cell at a wavelength of 400 Å.

The word "hindered" appears in many forms in the definition of the invention, but it is maintained because terms such as "hindered phenol" are well-known to the skilled artisan involved with polymer stabilization. The following defines terms used in the specification and claims:

(a) hindered phenol: a phenol having at the ortho position relative to the hydroxyl group of the phenol at least one alkyl group, preferably at least one tertiary(t)-alkyl group, more preferably having two alkyl groups, and most preferably having two t-alkyl groups, such as two t-butyl groups, and further when there is only one substitution at the ortho position, there is further at least one alkyl group, preferably a t-alkyl group, at the meta position;

(b) hydrolytically stable organic phosphite: an organic phosphite having at least one, preferably two, and most preferably three, aryl groups, preferably phenyl, attached through carbon-oxygen-phosphorus bonding, wherein the aryl group has at the ortho position relative to the phenolic group at least one alkyl group, preferably at least one tertiary (t)-alkyl group, more preferably having two alkyl groups, and most preferably having two t-alkyl groups, such as two t-butyl groups. Such materials are known to be hydrolytically stable in contrast, e.g., to trisalkyl phosphites.

An especially preferred stabilizer/antioxidant combination is from 500 to 3000 parts per million (ppm), i.e., 0.05 to 0.3 weight percent, of octadecyl 3,5-di-t-butyl-4-hydroxyhydrocinnamate and 500 to 1500 ppm of tris(2,4-di-t-butylphenyl) phosphite.

It is preferred that the crosslinkable core mixtures exhibit the percentage of polymerized units of a $C_1$–$C_{18}$ alkyl acrylate as 80 to 99.5 weight percent ethyl acrylate, further preferred that the chain transfer agent is an aliphatic mercaptan of from one to twenty carbon atoms, such as butyl mercaptan, dodecyl mercaptan, and the like, and further preferred that the initiator of polymerization is an azo compound.

It is further preferred that the crosslinkable core mixtures maintain the functionally reactive monomer as present at a level of from about 0.5 to about 12 weight percent, more preferably 2 to 12 weight percent, and it be selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, preferably 3-methacryloxypropyltrimethoxysilane. Further, it is preferred that the reactive additive is water and a silane condensation reaction catalyst, preferably a dialkyltin dicarboxylate, such as dibutyltin diacetate.

In the initial work described in U.S. Pat. No. 5,485,541, the curing for the alkoxysilane functionally reactive monomers is carried out by injecting water, an organotin catalyst, and (optionally) a solvent for the catalyst after the polymerization is complete but prior to co-extrusion with the cladding. It has been found that a curable core may be prepared when the organotin catalyst and the solvent for the catalyst are present during the polymerization, and then either there is addition of water just prior to the co-extrusion, or curing is conducted, after extrusion, in the presence of ambient diffused water. The latter process has been accelerated to a practical level by using a humidified oven or by curing in a highly humid controlled atmosphere. The advantage to the separation of water from the other components until the polymerization and cladding are complete is that premature crosslinking does not occur, with subsequent effects on extrusion and on the surface between core and clad. Useful claddings are fluorinated polymers, and two especially useful are terpolymers of perfluoroalkyl vinyl ether/tetrafluoroethylene/hexafluoropropylene (FEP) and of vinylidene fluoride/tetrafluoroethylene/hexafluoropropylene (THV). Samples clad with THV, which is more permeable to water than FEP, can be externally cured rapidly enough for the present purposes (without absorbing so much water that hazing occurs) at temperatures of 80° C. and 50% relative humidity, whilst samples clad with FEP can be cured rapidly enough for the present purposes at 85° C. and 85% relative humidity.

This crosslinkable core mixture may further contain a cladding polymer, such as a fluoropolymer which surrounds the core mixture, and preferably the crosslinkable core mixture within the extruded fluoropolymer cladding and the extruded fluoropolymer cladding are in substantially complete contact. It should be recognized that the thermoplastic crosslinkable core polymer and the cladding do not form a chemical or physical admixture, but are adjacent to each other in the construct which is the core mixture surrounded by the cladding.

We further have discovered, based upon the above-described crosslinkable core polymers, a flexible light pipe product containing the crosslinked core mixture described above, wherein the product has: good light transmittance wherein the differential transmission loss between light wavelengths of 400 nm and at 600 nm is equal to or less than 1.0 decibel per meter as measured by a non-destructive interference filter method; excellent thermal stability, when the vinyl end-group content is below 0.5 per 1000 monomer units, wherein a change in the differential transmission loss between light wavelengths of 400 nm and at 600 nm is equal to or less than 1.0 decibel per meter after 150 hours of exposure to a temperature of 120° C., as measured by a non-destructive interference filter method; excellent photo-thermal stability, wherein a change in the differential transmission loss between light wavelengths of 400 nm to 600 nm is equal to or less than 1.0 decibel per meter after 100 hours of exposure to a temperature of 110° C. simultaneously with exposure to 12 to 15 lumens/square millimeter of light, as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

We further have discovered a process for preparing a crosslinkable core mixture for a subsequently-cured composite comprising a coextruded cladding polymer and a coextruded crosslinkable core mixture, which mixture contains a thermoplastic core polymer having a weight average molecular weight from about 2,000 to about 250,000 daltons and preferably a vinyl end-group content of below 0.5 per 1000 monomer units, the process comprising a) preparing an admixture of
  i) from about 80 to about 99.9 weight percent of a bulk monomer mixture selected from a $C_1$–$C_{18}$ alkyl acrylate or mixtures thereof with up to 50 weight percent of the bulk monomer mixture of a $C_1$–$C_{18}$ alkyl methacrylate;
  ii) from about 0.1 to about 18.2 weight percent of a functionally reactive monomer, and
  iii) from 0 to about 10 weight of a refractive index increasing monomer selected from styrene, benzyl acrylate, benzyl methacrylate, phenylethyl acrylate or phenylethyl methacrylate;
b) adding 0.002 to 0.3 weight percent, based on the uncrosslinked copolymer weight, of an azo initiator of polymerization which preferably has a half-life at 60° C. of 20 to 400 minutes, preferably 100–250 minutes;
c) prior to, simultaneously, or after the addition of the initiator, adding 0.2 to 2.0 weight percent, preferably 0.75 to 1.5 weight percent, based on the uncrosslinked copolymer weight, of a chain transfer agent;
d) charging the monomer admixture, initiator, and chain transfer agent reaction mixture to a constant-flow stirred reactor heated to 70–120° C., preferably 85–100° C., with a preferred residence time of 5 to 30 minutes, more preferably 20–28 minutes, to form a polymerized, non-crosslinked, crosslinkable core mixture;

e) devolatilizing the polymerized, non-crosslinked, crosslinkable core mixture to remove unreacted monomers;

f) prior to, during, or after the devolatilization, adding from 0.1 to 10 weight percent, based on the crosslinkable core mixture, of a reactive additive;

g) prior to, during, or after the devolatilization adding from 0.01 to 1.0 weight percent, based on the crosslinkable core mixture weight, of a )5 stabilizer/antioxidant combination comprising 20–80 weight percent, based on the combination, of a hydrolytically stable organic phosphite, 80–20 weight percent, based on the combination, of a hindered phenol, the phenol preferably separately exhibiting an absorbance of less than 1 in a 5% ethyl acetate solution at a wavelength of 400 Å;

h) coextruding the crosslinkable core mixture and the cladding polymer to form a curable composite.

In this process, it is separately preferred that the coextruded cladding polymer and a coextruded crosslinkable core mixture be continuously, concurrently and coaxially extruded, that the cladding polymer be a molten fluoropolymer as described earlier, that the extruded crosslinkable core mixture within the extruded fluoropolymer cladding and the extruded fluoropolymer cladding be in substantially complete contact after filling the extruded tubular cladding with the extruded crosslinkable core mixture, and further that the curing is conducted subsequently and separately from the extrusion and cladding operation. Further, a portion of the reactive additive may be added to the core mixture after extrusion, such as by diffusion of water through the cladding.

We further have discovered a flexible light pipe product prepared by the above process, wherein the product has good light transmittance wherein the differential transmission loss between light wavelengths of 400 nm and at 600 nm is equal to or less than 1.0 decibel per meter as measured by a "cut-back" interference filter method; excellent thermal stability, wherein a change in the differential transmission loss between light wavelengths of 400 nm and at 600 nm is equal to or less than 1.0 decibel per meter after 150 hours of exposure to a temperature of 120° C., as measured by a non-destructive interference filter method; excellent photo-thermal stability, wherein a change in the differential transmission loss between light wavelengths of 400 nm to 600 nm is equal to or less than 1.0 decibel per meter after 100 hours of exposure to a temperature of 110° C. simultaneously with exposure to 12–15 lumens/square millimeter of light, as measured by a non-destructive interference filter method; good flexibility, wherein the product, at 20° C., survives without core fracture a 180° bend at a bend radius which is less than or equal to five times the diameter of the cured core; and good hardness properties, wherein the Shore "A" hardness is less than 90 after 50 days of exposure at 120° C.

The desired photo-thermal stability is preferably achieved when the polymer to be stabilized has a vinyl end-group content, as measured by NMR of below 0.5 per 1000 monomer units, as this adjustment leads to improved thermal stability as well.

An alternate way of expressing the photo-thermal stability achieved by the invention is that the lifetime, as judged by a 50% change in the differential transmission loss between light wavelengths of 400 nm to 600 nm on exposure to a temperature of 110° C. simultaneously with exposure to 12 to 15 lumens/square millimeter of light, as measured by a non-destructive interference filter method, is at least 150%, preferably 200% of that for a similar material absent the stabilizer/antioxidant combination.

It is preferred that the photo-thermally stable light pipe of the present invention be mounted in such a way with respect to the illumination source that heat from the source is removed by ventilation or insulation means, such as by the use of glass-based connectors between the light source and the near end of the FLP. It is separately preferred that the light from the light source be filtered to remove wave lengths shorter than 370 nm.

Although not wishing to be bound by any theory of stability of polymers, it is believed that it is deleterious to thermal and, to a much lesser extent, photochemical stability if the crosslinkable core polymer contains oligomers or polymers with terminal vinyl groups. Such oligomers or polymers may, in the presence of heat and/or light, form molecules with conjugated double bonds which eventually, with sufficient conjugation, form species which are color absorbers in the visible region of the spectrum, as well as lowering the amount of light which is delivered by the light pipe to the final source. Such vinyl double bonds, apart from residual monomer which can be reduced by carrying the reaction to higher conversion and/or devolatilization of the crosslinkable core prior to curing or crosslinking, may be formed by hydrogen abstraction followed by chain cleavage, or other forms of radical attack. These radicals may be, for example, from the initiator, some reaction product of the initiator, or from hydroperoxides formed in the presence of oxygen. The double bonds may also be formed by some form of termination reaction during the polymerization, even in the presence of a chain transfer agent used to reduce the molecular weight and keep the crosslinkable core polymer fluid in the melt prior to cladding and curing.

It has surprisingly been found that reduction of the reaction temperature and of the amount of initiator, preferably accompanied by a lowering of the residence time in the continuous reactor, is sufficient to make significant improvements in the initial color of the polymer core before and after curing, and to increase the thermal lifetime, as defined below, at 120° C., in the absence of any thermal or thermal-oxidative stabilizing additives. These results, especially relating to residence time in the reactor and to the temperature of polymerization, would not have been expected by one of ordinary skill in the art of bulk polymerization of acrylate monomers.

Although it is known to stabilize polymers of methyl methacrylate against; photo-degradation by use of selected antioxidants, the art is sparse in teaching appropriate stabilizers against photodegradation of optically clear polymers which comprise exclusively or predominantly polymerized units of alkyl acrylate monomers. There is even less teaching of combination and selection of stabilizer combinations against photo-thermal degradation, and it is not predictable from the prior art what binary or ternary combination would be effective. For example, alkyl sulfides and disulfides, very effective in thermal stabilization of polymethacrylates, are not particularly efficacious in photo-thermal stabilization of these acrylate polymers.

Even though the general mode of action of an individual stabilizer can be predicted, such as light absorption, conversion of a degradation product into a molecule which does not absorb visible light, or interfering with chain reactions caused by primary chain cleavage or abstraction, its interaction with a poly(alkyl acrylate) is difficult to predict. Further, the art is silent on the potential mode of response for combinations of stabilizer active in different modes as applied to poly(alkyl acrylates). As seen in the Examples, there exist individual stabilizers effective only in combination with others, as well as combinations which are not efficient enough to achieve the stabilization goal which can be achieved by certain selected additives.

EXPERIMENTAL

The various stabilizers and antioxidants studied are tabulated below (Table I) by trade name, supplier, class, and by the best structure available from the descriptive literature.

3-methacryloxypropyltrimethoxysilane (MATS) (5 wt. % based on monomer weight (b.o.m.), 6.4 g. of initiator (recrystallized 2,2'-azobis(2-methylbutyronitrile) (0.064 wt. %) and 100 g. of n-dodecyl mercaptan (1 wt. %). The mixture was sparged for at least 15 minutes with nitrogen and degassed under 28 inches (711 mm.) vacuum as it was pumped into the reactor.

TABLE I

Stabilizers and Antioxidants Considered in this Application for Photo-Thermal Stabilizers for an Acrylate-Based Flexible Light Pipe

| Designation | Type | Formula | Name/Supplier |
|---|---|---|---|
| RP-1 | hindered phenol/isocyanurate | tris(3,5-di-t-butyl 4-hydroxybenzyl)isocyanurate | Irganox 3114 |
| HP-2 | hindered phenol | butylated hydroxytoluene (2,6-di-t-butyl-4-methylphenol) | BHT |
| HP-3 | hindered phenol | 1,3,5-trimethyl-2,4,6-tris(3,5-di-tert-butyl-4-hydroxybenzyl)benzene | Ethanox 330 |
| HP-4A | hindered phenol | tetrakis(methylene(3,5-di-t-butyl-4-hydroxyhydrocinnamate))methane | Irganox 1010 |
| HP-4B | hindered phenol | tetrakis(methylene(3,5-di-t-butyl-4-hydroxyhydrocinnamate))methane | Ultranox 210 |
| HP-5A | hindered phenol | octadecyl 3,5-di-t-butyl-4-hydroxyhydrocinnamate | Irganox 1076 |
| HP-5B | hindered phenol | octadecyl 3,5-di-t-butyl-4-hydroxyhydrocinnamate | Ultranox 276 |
| HP-6 | hindered phenol | 3/1 condensate of 3-methyl-6-t-butylphenol and crotonaldehyde; believed to be mainly 1,1,3-tris(2-methyl-4-hydroxy-5-t-butylphenyl)butane | Topanol CA |
| HP-7 | hindered phenol and organic sulfide | benzenepropanoic acid, 3,5-bis(1,1-dimethylethyl)-4-hydroxy-, thiodi-2,1,ethanediyl ester or thiodiethylene bis(3,5,-di-tert-butyl-4-hydroxy-hydrocinnamate) | Irganox 1035 |
| HSP-1 | hydrolytically stable organic phosphite | 2,2'-Ethylidenebis(4,6-di-t-butylphenyl)fluorophosphonite | Ethanox 398 |
| HSP-2 | hydrolytically stable organic phosphite | tris(2,4-di-tert-butylphenyl) phosphite | Irgafos 168 |
| HSP-3 | hydrolytically stable organic phosphite | Phosphorus Trichloride, Reaction Products with 1,1'-biphenyl and 2,4-bis(1,1-dimethylethyl)Phenol | P-EPQ |
| HUSP-1 | hydrolytically unstable organic phosphite | bis(2,4-di-t-butylphenyl)pentaerythritol diphosphite | Ultranox 626 |
| HUSP-2 | hydrolytically unstable organic phosphite | Diisodecyl pentaerythritol diphosphite | Weston XR 2806 |
| NHP | non-hindered phenol | monomethyl ether of hydroquinone | MEHQ |
| OS-1 | organic sulfide | dilauryl thiodipropionate | DLDTP |
| ODS-1 | organic disulfide | di(t-dodecyl)disulfide | DTDDS |

A standard laboratory process was employed as the control, following the method of Example 1 (tube filling) and Example 29 (compositional details) of U.S. Pat. No. 5,485,541. The monomer composition was 95% EA (purified through acidic alumina) and 5% distilled MATS (3-methacryloxypropyltrimethoxysilane). Vazo 67, (DuPont) 2,2'-azobis(2-methylbutyronitrile) initiator was used at a level of 0.064% of the monomer. A chain transfer agent, n-dodecyl mercaptan, was used at a level of 1% of the amount of monomer. The standard reactor temperature was 125° C. and the standard residence time was 28 minutes. After devolatilization, the polymer was used to fill FEP/polyethylene tubes. Catalyst (20 ppm dibutyltin diacetate, based on polymer, in butyl acetate) and water (0.40%) were separately mixed into the polymer as it was pumped into the tubes. A third solution, containing the selected antioxidants or stabilizers, was added at a rate of 2.4 cc. of solution per 100 grams of polymer. The variations utilized (beyond the stabilizer/antioxidants) are summarized in Table 2 (below).

The following outlines the details of the standard polymerization, which is used as the basis for the process changes listed in Table I: Monomer mixes were prepared as follows: To a 19 liter 316 stainless steel vessel were added and mixed 9500 g of ethyl acrylate, 500 grams of the functionally reactive monomer, The monomer mix was fed through a 0.045 micron PTFE membrane cartridge filter to a 2000 ml stainless steel constant flow stirred tank reactor (CFSTR). During polymerization, flow rates for the 2000 ml CFSTR were ca. 70 g/min. to produce a 28-minute residence time. The CFSTR was equipped with multiple (6) blade 45° pitch turbine agitators. During polymerization, the reactors were held at 125° C., and agitated at 225 rpm under a pressure of 1035 kPa (150 psi). Reactor effluent (copolymer and residual monomer) was fed through a back-pressure valve set nominally at 1035 kPa (150 psi) into a devolatilization column comprising a stainless steel twisted-tape motionless mixer (60 cm. in length with a jacket of about 50 cm length) mounted on an 39-liter (ca. 9-gallon) stainless steel catchpot. Heating oil recirculated through the column jacket was held at 200° C. at the jacket inlet. The catch-pot was held at 100–110° C. and ca. 300–400 mm. of vacuum during devolatilization. Upon completion of the polymerization, the catch-pot was back-filled with filtered nitrogen. The monomer-to-polymer conversion of the effluent was approximately 87–88%, as measured gravimetrically. Gravimetrically determined solids content of the devolatilized polymer typically is 99.5 wt.

Polymer variations used in the evaluation of antioxidants are summarized in Table 2.

TABLE 2

Polymer/Process Variations

| Variable | Standard | Variations |
|---|---|---|
| Monomer Composition | 95% EA/5% MATS | 66.5% EA/28.5% BMA/5% MATS<br>95% EA/5% MATS + 0.5% ETEMA<br>66.5% EA/28.5% BMA/5% MATS + 0.5% ETEMA |
| EA Purification | Acidic Alumina | Basic Alumina and Molecular Sieve |
| Initiator | 0.064% Vazo 67 | 0.032% Vazo 67<br>0.0208% Vazo 52<br>0.0104% Vazo 52 |
| Chain Transfer Agent | 1.0% n-DDM | 1.5% n-DDM (n-dodecyl mercaptan)<br>0.6% t-BuSH (t-butyl mercaptan)<br>0.97% MPTMS (mercaptopropyl trimethoxysilane) |
| MATS | Distilled | 5 ppm 4-hydroxyTEMPO (2,2,6,6-tetramethyl-4-hydroxy-piperidine-N-oxyl), in MATS |
| Reaction Temperature | 125 C. | 95 C.<br>105 C. |
| Residence Time | 28 minutes | 22 minutes |

BMA = butyl methacrylate
ETEMA = ethylthioethyl methacrylate
Vazo 52 = DuPont 2,2'bisazo(2,4-dimethylvaleronitrile), a lower temperature initiator Table 3 lists the actual polymers that were prepared and evaluated. 15–35 kg of polymer was produced in each preparation. This was sufficient to make six FEP/polyethylene tubes (5.1 mm id) 2 meters in length for each of 3–12 antioxidant combinations. In addition, 6–12 tubes were prepared with cure additives but no added antioxidants.

TABLE 3

Polymer Composition and Process

| Run # | Polymer ID | RM Variables | Process Variables |
|---|---|---|---|
| 1A | AB2441 | 1.5% nDDM | Standard |
| 1B | AB2457 | 1.5% nDDM | Standard |
| 2 | AB2468 | Standard | Standard |
| 3 | AB2480 | 0.5% ETEMA | Standard |
| 4 | AB2488 | 28.5% BMA + 0.5% ETEMA | Standard |
| 5 | AB2601 | 28.5% BMA | Standard |
| 6 | AB2620 | Standard | 22' |
| 7 | AB2628 | 0.6% t-BuSH | Standard |
| 8 | AB2643 | Y-11700 MATS | Standard |
| 9 | AB2842 | Standard | Standard |
| 10 | AB2610 | Standard | 95° C. |
| 11 | AB2637 | 0.032% Vazo 67 | 105° C. |
| 12 | AB2651 | 0.6% t-BUSH | 105° C. |
| 13 | AB2661 | 0.0208% Vazo 52 | 95° C., 22' |
| 14 | AB2669 | 0.0208% Vazo 52, 1.5% nDDM | 95° C., 22' |
| 15 | AB2689 | Y-11700 MATS | 105° C. |
| 16 | AB2811 | 0.0208% Vazo 52 | 95° C., 22' |
| 17 | AB2817 | 0.0208% Vazo 52, 1.5% nDDM | 95° C., 22' |
| 18 | AB2822 | 0.0208% Vazo 52, 0.97% 3-MPTMS | 95° C., 22' |
| 19 | AB2826 | 0.0104% Vazo 52 | 95° C., 22' |
| 20 | AB2850 | 0.0208% Vazo 52 | 95° C. |
| 21 | AB2858 | 0.0208% Vazo 52, EA Purified through Basic Alumina and Molecular Sieve | 95° C., 22' |

Thermal Degradation

Light pipe was evaluated for thermal stability by measuring the time required for the transmitted light to become yellow. The absorption vs. wavelength spectrum of a 6 foot section of light pipe was measured. The difference in the absorption at 400 nm and 600 nm ($A_{400}$–$A_{600}$) was calculated from the spectrum. Since thermal aging causes an increase in the absorbance at short wavelengths (400 nm) but little change at long wavelengths (600 nm), changes in this difference ($A_{400}$–$A_{600}$) are a measure of increases in the yellowness of transmitted light. The light pipe was thermally aged in a forced air oven at 120° C. Periodically, the light pipe was removed from the oven, the absorption spectrum was measured, and $A_{400}$–$A_{600}$ was calculated. The thermal lifetime was calculated as the time required for the absorbance to increase by 1 dB/m from its initial value.

The thermal lifetimes (in hours) of the light pipes containing antioxidants are recorded in tables 3 and 4. For comparison, the thermal lifetimes of the controls, light pipes prepared from the same core polymer but containing no antioxidant, are also included in these tables. The hindered phenolics which have low color, especially Irganox 1076 and Ultranox 276 (HP-5A and HP-5B), increase the thermal lifetime of the light pipe. Even larger increases are observed with combinations of these hindered phenolics and aromatic phosphites with ortho-alkyl substituents, especially HSP-2.

The light pipes prepared from a hindered phenolic and diisodecyl pentaerythritol diphosphite (HUSP; see table 3) were not tested since these light pipes became very hazy on storage. We have observed a similar hazing phenomenon for light pipes containing trisisooctyl phosphite, phenyl neopentylene glycol phosphite, and tris(dipropylene glycol) phosphite. The large light losses associated with this haziness makes formulations containing these aliphatic or partially aliphatic phosphites unsuitable for light pipe applications.

Photothermal Degradation

Photothermal durability studies were performed using the General Electric XMH-60 lamp with the filter substituted by an Optivex filter. The light was passed through a mixing rod (11.5 mm square coupler) to provide a uniform light output of 12–15 lumens per square millimeter. Four 5 mm light pipes were heat shrunk onto glass rods and these were then heat shrunk onto the square coupler. The light pipes then passed through an oven at 110° C. The fibers were connected to a filter/photodiode holder.

Periodically during the test the photodiode response was measured through 400 nm, 450 nm and 600 nm filters. The data was treated by dividing the 400 nm reading by the 600 nm reading and normalizing for the initial ratio. A plot of $$(\%T^t_{400}/\%T^t_{600})/(\%T^0_{400}/\%T^0_{600}) \text{ vs. time}$$

was constructed, where ($\%T^t_{400}/\%T^t_{600}$) is the voltage ratio at time t, and ($\%T^0_{400}/\%T^0_{600}$) is the initial voltage ratio. The lifetime is defined as the time at which this ratio falls to 0.5 and was determined by interpolation. This corresponds to a 50% loss in initial transmission at 400 nm. It correlates fairly well with the time at which the light transmitted through 5 foot of light pipe appears yellow.

One of the four light pipes in each set was a control, a light pipe made with the same polymer but containing no added antioxidants. The durability recorded for each formulation in the following tables is the ratio of the lifetime of the light pipe containing antioxidants to that of the control. It therefore, represents the increase in lifetime due to the presence of antioxidants. The lifetime of the controls varies from 35 to 110 hours, depending on the polymer formulation and on the conditions of the particular aging experiment (light intensity).

TABLE 4

Durability of Light Pipe Prepared at 125° C.
(thermal lifetime/photothermal lifetime/photothermal lifetime ratio)

| Antioxidant(s) | Antioxidant Level, ppm | 2441 (Ex. 1A) | 2457 (Ex. 1B) | 2468 (Ex. 2) | 2480 (Ex. 3) | 2488 (Ex. 4) | 2601 (Ex. 5) | 2620 (Ex. 6) | 2628 (Ex. 7) | 2643 (Ex. 8) | 2842 (Ex. 9) |
|---|---|---|---|---|---|---|---|---|---|---|---|
| NONE | | /53/ | 88/61–76/ | 16–26/43–63/ | /42–58/ | /25–36/ | /22–51/ | 69/46–85/ | /39–59/ | 24/37–64/ | 141–200/65/ |
| Irganox 1035 (HP-7) | 1000 | 103/ /  | | | | /71/2.5 | | | | | |
| | 2000 | | | /34/0.8 | | | | | | | |
| | 3000 | 60/ /  | | 25/ /  | /68/1.5 | /45/1.6 | | | | | |
| Topanol CA (HP-6) | 2000 | | | | | | | | | | |
| Irganox 1010 (HP-4A) | 3000 | | | | /36/0.9 | /36/1.4 | | | | | |
| | 1000 | 97/ /  | | | | | | | | | |
| Irganox 1076 or U276 (HP-5) | 3000 | 58/ /  | | | /64/1.4 | /60/2.4 | | | | /164/2.6 | |
| | 1000 | >121/ /  | | | | | | | | | |
| | 1500 | | | | | | /100/2.4 | | | | |
| | 3000 | >121/ /  | | | /78/1.7 | | /91/2.2 | | | | |
| | 5000 | | | | | | /86/2.0 | | | /191/3.0 | |
| Irganox 3114 (HP-1) | 1000 | 113/ /  | | | | | | | | | |
| Ethanox 330 (HP-3) | 3000 | 78/ /  | | | | | | | | | |
| | 1000 | 8/ /  | | | | | | | | /87/2.1 | |
| MEHQ (NSP) | 40 | | | | | | | | | /92/2.2 | |
| | 200 | | | | | | | | | /53/1.3 | |
| | 1000 | | | | | | | | | | |
| Irgafos 168 (HSP-2) | 1000 | | 112/ /  | /52/0.8 | | | /162/3.3 | | /112/2.9 | 189/143/2.7 | |
| Ethanox 398 (HSP-1) | 1000 | | 49/ /  | | | | | | 98/2.1 | | |
| Irganox 1035/ Irgafos 168 (HP-7/HSP-2) | 2000/500 | | | /112/2.6 | | | | | | | |
| Irganox 1035/ Irgafos 168 (HP-7/HSP-2) | 750/1000 | | | | | | | | | | 228/ /  |
| Irganox 1035/ Irgafos 168 (HP-7/HSP-2) | 2000/1000 | | | /155/3.6 | /173/4.1 | /175/6.2 | /182/3.7 | | | | 146/ /  |
| | 3000/1000 | | | | | | | | | | |
| | 750/1200 | | | | | | /185/3.6 | | | | 221/ /  |
| Irganox 1076/ Irgafos 168 (HP-5A/HSP-2 (or U276/1168) | 3000/500 | | | | | | | | | | |
| | 400/1000 | | | | | | | | | | 231/ /  |
| (HSP-5B/HSP-2) | 750/1000 | | | | | | | | | 771/338/7.9 | 144/341/5.2 |
| | 1500/1000 | | | | | | | | | 507/337/7.8 | 123/ /  |

TABLE 4-continued

Durability of Light Pipe Prepared at 125° C.
(thermal lifetime/photothermal lifetime/photothermal lifetime ratio)

| Antioxidant(s) | Antioxidant Level, ppm | 2441 (Ex. 1A) | 2457 (Ex. 1B) | 2468 (Ex. 2) | 2480 (Ex. 3) | 2488 (Ex. 4) | 2601 (Ex. 5) | 2620 (Ex. 6) | 2628 (Ex. 7) | 2643 (Ex. 8) | 2842 (Ex. 9) |
|---|---|---|---|---|---|---|---|---|---|---|---|
| Topanol CA/ Irgafos 168 (HP-6/HSP-2) | 2000/1000 3000/1000 5000/1000 750/1200 | | | | | | | 255/299/5.2 115/299/5.2 | | 290/247/5.7 | 186/201/3.1 |
| Irganox 1010/ Irgafos 168 (HP-4A/HSP-2) | 2000/1000 | | | 62/_/_ | | | | | /138/3.5 | | |
| Irgafos 168 (or U210/ 1168) (HP-4B/HSP-2) | 750/1000 | | | | | | | | | | 273/_/_ |
| BHT/Irgafos 168 (NHP/HSP-2) | 3000/1000 750/1200 3000/1000 | | | | | | | 113/226/3.9 /86/1.5 | /147/3.2 | 103/254/4.8 | 259/_/_ |
| Irganox 1076/ Ethanox 398 (HP-5A/HSP-1) | 3000/1000 | | | | | | | /300/5.4 | 114/2.5 | | |
| Irganodx 1035/ Irgafos 168 (HP-7/ HSP-2) | (HP-7/ HSP-2) | | | | | | | HAZY | | | |
| Ultranox 276/ XR2806 (HP-5B/HUSP-2) | 3000/1000 | | | | | /166/6.6 | | | | | |
| U-276/BHT/I-168 (HP-5B/HP-2/ HPS-2) | 2000/ 2000/ 1000 | | | | | | | /95/1.3 | | | |
| Irganox 1035/ XR2806 (HP-7/HUSAP-2) | 3000/1000 | | | HAZY | | | | | | | |
| Irganox 1035/ DLTDP (HP-7/OS-1) | 3000/1000 | | | | /104/1.8 | | | | | | |
| Irganox 1035/ DTDDS (HP-7/ODS-1) | 3000/1000 | | | 25/24/0.4 | 16/0.3 | | | | | | |
| Irganox 1076 (or U276)/DLTDP (HP-5/OS-1) | 5000/2000 | | | | | | | 127/94/1.3 | | | |
| 1-1076/I-168/ DLTDP (HP-5A/HSP-2/OS-1) | 3000/ 1000/ 1000 | | | | | | | | /127/3.3 | | |

| | | | | | | | 2601 (Ex. 5) | | | | |
| Irganox 1035/ Irgafos 168 | | | | | | | /231/4.7 /196/3.8 | | | | |

TABLE 5

Durability of Light Pipe Prepared at 95–105° C.
(thermal lifetime/photothermal lifetime/photothermal lifetime ratio)

| Antioxidant(s) | Antioxidant Level, ppm | 2610 (Ex. 10) | 2637 (Ex. 11) | 2651 (Ex. 12) | 2661 (Ex. 13) | 2669 (Ex. 14) | 2689 (Ex. 15) |
|---|---|---|---|---|---|---|---|
| None | | 78–92/67–132/__ | __/53–66/__ | __/44–65/__ | 178–212/65–112/__ | 156/60–84/__ | 50–62/49–89/__ |
| Irganox 1076 or U276 (HP-5) | 750 | | | | | 432/79–146/2.2 | |
| | 1000 | | | | | | 94/89/1.0 |
| | 1500 | | | | | 439/174/2.6 | |
| | 3000 | 222/140/1.1 | | | | 350/89–190/2.8 | 86/104/1.2 |
| MEHQ (NHP) | 200 | | | | | | 107/__/__ |
| Irgafos 168 (HSP-2) | 1000 | 289/217/1.6 | | __/173/3.1 | 185/115–151/2.0 | | 68/119/1.3 |
| | 2500 | | | __/353/6.4 | | | |
| Ethanox 398 (HSP-1) | 1500 | | | | 59/183–198/2.6 | | |
| P-EPQ (HSP-3) | 500 | | | | >09/285/3.8 | | |
| DLTDP (OS-1) | 1000 | 97/103/1.5 | | | | | 50/__/__ |
| Irganox 1035/ Irgafos 168 (HP-7/HSP-2) | 750/1000 | | | | | | |
| Irganox 1076/ Irgafos 168 (or U276/I168) (HP-5/HSP-2) | 400/1000 | | | | | | |
| | 750/1000 | | | | | 371/202/3.4 | __/204/4.2 |
| | 1500/1000 | | | | | 315/284/3.4 | 97/222/4.5 |
| | 2000/1000 | | | | | | |
| Irganox 1076/ Irgafos 168 | 3000/1000 | 357/209/3.1 | __/170/2.7 | __/153/2.8 | 188/210–332/3.0 | 266/216/3.6 | 81/203/4.1 |
| | 5000/1000 | 147/171/2.6 | | | | | |
| | '750/1200 | | | | | | |
| | 900/1200 | | | | | | |
| | 1500/1200 | | | | | | |
| | 750/1500 | | | | | 360/286/4.3 | |
| | 1200/1200 | | | | | | |
| | 1500/1500 | | | | | 232/253–574/7.7 | |
| | 3000/1500 | | | __/176/3.3 | | 174/395 3.5 | |
| | 3000/2000 | | | __/220/4.1 | | | |
| Topanol CA/ Irgafos 168 (HP-6/HSP-2) | '750/1000 | | | | | | |
| Irganox 1010/Irgafos 168 (or U210/I168 (HP-4/HSP-2) | 750/1000 | | | | | | |
| | 1500/1000 | | | | | | 72/221/3.6 |
| | 3000/1000 | 121/227/3.4 | __/184/2.9 | | __/205/2.5 | | |
| Cyanox 425/Irgafos 168 (HP/HSP-2) | 750/1000 | Phenol initially colored; see Table 6 | | | | | |
| Cyanox 2246/Irgafos 168 (HP/HSP-2) | 750/1000 | Phenol initially colored; see Table 6 | | | | | |
| Irganox 1076/ Ethanox 398 (HP-5/HSP-1) (or | 3000/1000 | | __/250/4.0 | | | | |
| | 750/1500 | | | | | 141/228/3.4 | |
| | 1500/1500 | | | | __/268/3.3 | | |
| | 3000/2000 | | | __/255/4.6 | | | |
| Irganox 1076/ DLTDP (HP-5/OS-1) (or | 1500/1000 | | | | | | 86/83/1.4 |
| U276/DLTDP) | 3000/1000 | 244/152/2.3 | | | | | |
| I-1076/I-168/ DLTDP (HP-5A/HSP-2/OS-1) | 1500/3000 750/1000/ 1500 | | | | | 391/213/__ | |

| Antioxidant(s) | Antioxidant Level, ppm | 2811 (Ex. 16) | 2817 (Ex. 17) | 2822 (Ex. 18) | 2826 (Ex. 19) | 2850 (Ex. 20) | 2858 (Ex. 21) |
|---|---|---|---|---|---|---|---|
| None | | 122–159/46–115/__ | 148–172/38–50/__ | 14–16/57–83/__ | 126–183/44–75/__ | 189–253/68–84/__ | 223–279/72–89/__ |
| Irganox 1076 or U276 (HP-5) | 750 | | | | | | |

TABLE 5-continued

Durability of Light Pipe Prepared at 95–105° C.
(thermal lifetime/photothermal lifetime/photothermal lifetime ratio)

| | | | | | | | |
|---|---|---|---|---|---|---|---|
| | 1000 | | | | | | |
| | 1500 | | | | | | |
| | 3000 | | | | | | |
| MEHQ (NHP) | 200 | | | | | | |
| Irgafos 168 (HSP-2) | 1000 | | | | | | |
| | 2500 | | | | | | |
| Ethanox 398 (HSP-1) | 1500 | | | | | | |
| P-EPQ (HSP-3) | 500 | | | | | | |
| DLTDP (OS-1) | 1000 | | | | | | |
| Irganox 1035/ Irgafos 168 (HP-7/HSP-2) | 750/1000 | | | | 235/131/2.4 | | |
| Irganox 1076/ Irgafos 168 (or U276/I168) (HP-5/HSP-2) | 400/1000 | | | | 313/124/1.7 | | |
| | 750/1000 | 237/348/3.0 | 235/171/4.5 | | 329/179/2.4 | 297/_/_ | 341/_/_ |
| | 1500/1000 | 239/201–414/3.6 | 228/134–279/3.5 | 31/111/1.6 | 311/261/3.5 | 287/219/3.2 | 297/246/2.8 |
| | 2000/1000 | | | | | 297/_/_ | |
| Irganox 1076/ Irgafos 168 | 3000/1000 | 182/196–272/2.4 | 156/155–261/4.1 | 27/108/1.6 | | | 270/_/_ |
| | 5000/1000 | | | | | | |
| | 750/1200 | | | | 275/156/3.5 | | |
| | 900/1200 | | | | | 306/_/_ | |
| | 1500/1200 | | | | | 298/315/3.8 | |
| | 750/1500 | | | | | | |
| | 1200/1200 | | | | | 310/_/_ | |
| | 1500/1500 | | | | | 286/295/3.5 | |
| | 3000/1500 | | | | | | |
| | 3000/2000 | | | | | | |
| Topanol CA/ Irgafos 168 (HP-6/HSP-2) | 750/1000 | | | | 271/138/2.6 | | |
| Irganox 1010/Irgafos 168 (or U210/I168) (HP-4/HSP-2) | 750/1000 | | | | 236/142/2.6 | | |
| | 1500/1000 | | | | | | |
| | 3000/1000 | | | | | | |
| Cyanox 425/Irgafos 168 (HP/HSP-2) | 750/1000 | | | | 37/_/_ | | |
| Cyanox 2246/Irgafos 168 (HP/HSP-2) | 750/1000 | | | | | 39/_/_ | |
| Irganox 1076/ Ethanox 398 (HP-5/HSP-1) (or U276/I168) | 3000/1000 | | | | | | |
| | 750/1500 | | | | | | |
| | 1500/1500 | | | | | | |
| | 3000/2000 | | | | | | |
| Irganox 1076/ DLTDP (HP-5/OS-1) (or U276/DLTDP) | 1500/1000 | | | | | | |
| | 3000/1000 | 244/152/2.3 | | | | | |
| | 1500/3000 | | | _/106/1.6 | | | |
| I-1076/I-168/ DLTDP (HP-5A/HSP-2/OS-1) | 750/1000/ 1500 | | | | | | |

The results in Tables 4 and 5 indicate:

Hindered phenolic antioxidants at a level of 0.075–0.5% (750–5000 ppm) increase the photothermal lifetime by about 50–200%.

Phosphite antioxidants (0.05–0.25%) increase the photothermal lifetime by about 30–500%. Hydrolysis resistant phosphites (such as Irgafos 168 (HSP-2), P-EPQ (HSP-3), Ethanox 398 (HSP-1), and those of similar structure) are required since those that are not hydrolysis resistant lead to hazing of the light pipe and large white light losses (see the results with Weston XR2806 (HUSP-2)).

Thioether antioxidants increase the photothermal lifetime by about 50%.

Combinations of hindered phenolics and hydrolysis resistant phosphites consistently result in large increases in photothermal lifetime (about 150–700%).

Combinations of hindered phenolics and thioethers give an increase in photothermal lifetime of about 30–130%.

EXAMPLE 22

The absorption spectra of a series of hindered phenolics were measured. A 5% solution of the hindered phenolic in ethyl acetate was prepared. The absorption spectrum was recorded in a 10 cm cell. The absorbance at 400 nm is recorded in Table 6. The absorbance ranges from very low to over 3. The absorbance at 400 nm may not be due to the electronic absorption of the hindered phenolic, but may result from impurities in the commercial product.

TABLE 6

Comparison of Hindered Phenolics

| Antioxidant | 400 nm Absorbance (1) | Thermal Lifetime (hours) | Photothermal Lifetime (hours) |
|---|---|---|---|
| None | — | 126–183 | 44–75 |
| Irganox 1076 (HP-5A) | 0.053 | 329 | 179 |
| Irganox 1010 (HP-4A) | 0.160 | 236 | 142 |
| Topanol CA (HP-6) | 0.625 | 271 | 138 |
| Irganox 1035 (HP-7) | 0.163 | 235 | 131 |
| Cyanox 425 (2) (HP) | 3.303 | 37 | not measured |
| Cyanox 2246 (3) (HP) | 3.048 | 39 | not measured |
| Ethanox 330 (HP-3) | 0.164 | no sample | no sample |

(1) 5% hindered phenolic in ethyl acetate, 10 cm cell
(2) Cyanox 425: 2,2'-Methylenebis(4-ethyl-6-tert-butylphenol)
(3) Cyanox 2246: 2,2'-Methylenebis(4-methyl-6-tert-butylphenol)

The thermal and photothermal data for the light pipes prepared with 750 ppm hindered phenolic and 1000 ppm Irgafos 168 from table 4 are re-summarized in Table 6. The data indicate that the ones with a 400 nm absorbance of less than 1, provide increased thermal and photothermal stability. The measured thermal lifetimes are 235–329 hours and the measured photothermal lifetimes are 131–179 hours. The two high absorbing antioxidants (used as available, without purification) that were tested result in thermal lifetimes less than 40 hours, significantly lower than that of the control with no added antioxidant. The preferred hindered phenolics are those that have an absorbance of less than 1 at 400 nm (5% solution in ethyl acetate, 10 cm cell). This low absorbance is also beneficial at minimizing any color shift in the transmitted light.

We claim:

1. A crosslinkable core mixture for a subsequently-cured composite which mixture contains a thermoplastic core polymer, the thermoplastic core polymer having a weight average molecular weight from about 2,000 to about 250,000 daltons, the core mixture comprising
    (a) a thermoplastic core polymer comprising
        i) from 80 to 99.9 weight percent of polymerized units of a $C_1$–$C_{18}$ alkyl acrylate or mixtures thereof with up to 50 weight percent of the components of (a)(i) of polymerized units of a $C_1$–$C_{18}$ alkyl methacrylate;
        ii) from 0.1 to 18.2 weight percent of polymerized units of a functionally reactive monomer, and
        iii) from 0 to about 10 weight percent of polymerized units of a refractive index increasing monomer selected from styrene, benzyl acrylate, benzyl methacrylate, phenylethyl acrylate or phenylethyl methacrylate;
        iv) 0.002 to 0.3 weight percent residual molecules of or of decomposition products of an initiator of polymerization, including end groups on the thermoplastic core polymer;
        v) from 0.2 to 2.0 weight percent of residual molecules of or of decomposition products of a chain transfer agent, including end groups on the thermoplastic core polymer;
    (b) from 0.1 to 10 weight percent, based on the crosslinkable core mixture weight, of a reactive additive; and
    (c) from 0.01 to 1.0 weight percent, based on the crosslinkable core mixture weight, of a stabilizer/antioxidant combination comprising 20–80 weight percent, based on the combination, of an organic phosphite which is hydrolytically stable and 80–20 weight percent, based on the combination, of a hindered phenol.

2. The crosslinkable core mixture of claim 1, wherein the thermoplastic core polymer has a vinyl end-group content of below 0.5 per 1000 monomer units.

3. The crosslinkable core mixture of claim 1 or 2, further containing at least one fluorocarbon cladding polymer which surrounds the core mixture.

4. The crosslinkable core mixture of claim 1 or 2 wherein the percentage of polymerized units of a $C_1$–$C_{18}$ alkyl acrylate is 80 to 99.5 weight percent ethyl acrylate, wherein the chain transfer agent is an aliphatic mercaptan of from one to twenty carbon atoms, and wherein the initiator of polymerization is an azo compound having a half-life at 60° C. of 20 to 400 minutes.

5. The crosslinkable core mixture of claim 1 or 2 wherein the functionally reactive monomer is present at a level of from about 0.5 to about 12 weight percent and is selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, wherein the reactive additive is water and a silane condensation reaction catalyst, wherein the hindered phenol is from 500 to 3000 parts per million of octadecyl 3,5-di-t-butyl-4-hydroxyhydrocinnamate and the hydrolytically stable organic phosphite is from 500 to 1500 parts per million of tris(2,4-di-t-butylphenyl) phosphite.

6. The crosslinkable core mixture of claim 3 wherein the functionally reactive monomer is present at a level of from about 0.5 to about 12 weight percent and is selected from 2-methacryloxyethyltrimethoxysilane, 3-methacryloxypropyl-trimethoxysilane, 3-acryloxypropyltrimethoxysilane, vinyltrimethoxysilane, vinyltriethoxysilane, or mixtures of these, wherein the reactive additive is water and a silane condensation reaction catalyst, wherein the hindered phenol is from 500 to 3000 parts per million of octadecyl 3,5-di-t-butyl-4-hydroxyhydro-cinnamate and the hydrolytically stable organic phosphite is from 500 to 1500 parts per million of tris(2,4-di-t-butylphenyl) phosphite.

7. A process for preparing a crosslinkable core mixture for a subsequently-cured composite comprising a coextruded cladding polymer and a coextruded crosslinkable core mixture, which mixture contains a thermoplastic core polymer having a weight average molecular weight from about 2,000 to about 250,000 daltons, the process comprising
    a.) preparing an admixture of
        i) from about 80 to about 99.9 weight percent of a bulk monomer mixture selected from a $C_1$–$C_{18}$ alkyl acrylate or mixtures thereof with up to 50 weight percent of the bulk monomer mixture of a $C_1$–$C_{18}$ alkyl methacrylate;
        ii) from about 0.1 to about 18.2 weight percent of a functionally reactive monomer, and iii) from 0 to about 10 weight of a refractive index increasing monomer selected from styrene, benzyl acrylate, benzyl methacrylate, phenylethyl acrylate or phenylethyl methacrylate;

b) adding 0.002 to 0.3 weight percent, based on the uncrosslinked copolymer weight, of an azo initiator of polymerization;

c) prior to, simultaneously, or after the addition of the initiator, adding 0.2 to 2.0 weight percent, based on the uncrosslinked copolymer weight, of a chain transfer agent;

d) charging the monomer admixture, initiator, and chain transfer agent reaction mixture to a constant-flow stirred reactor heated to 70–120° C., to form a polymerized, non-crosslinked, crosslinkable core mixture e) devolatilizing the polymerized, non-crosslinked, crosslinkable core mixture to remove unreacted monomers;

f) prior to, during, or after the devolatilization and/or co-extrusion, adding from 0.1 to 10 weight percent, based on the crosslinkable core mixture weight, of a reactive additive;

g) prior to, during, or after the devolatilization adding from 0.01 to 1.0 weight percent, based on the crosslinkable core mixture weight, of a stabilizer/antioxidant combination comprising 20–80 weight percent, based on the combination, of a phosphite which is hydrolytically stable and 80–20 weight percent, based on the combination, of a hindered phenol;

h) coextruding the crosslinkable core mixture and the cladding polymer to form a curable composite.

8. The process of claim 7 wherein the coextruded cladding polymer and a coextruded crosslinkable core mixture are continuously, concurrently and coaxially extruded, wherein the cladding polymer is a molten fluoropolymer, wherein the extruded crosslinkable core mixture within the extruded fluoropolymer cladding and the extruded fluoropolymer cladding are in substantially complete contact after filling the extruded tubular cladding with the extruded crosslinkable core mixture, wherein further the curing is conducted subsequently and separately from the extrusion and cladding operation, and wherein the hindered phenol is from 500 to 3000 parts per million of octadecyl 3,5-di-t-butyl-4-hydroxyhydrocinnamate and the hydrolytically stable organic phosphite is from 500 to 1500 parts per million of tris(2,4-di-t-butylphenyl) phosphite.

* * * * *